March 16, 1937.  J. F. ROBB  2,073,652

CENTRAL MIXING PLANT

Filed March 12, 1936  4 Sheets-Sheet 1

Inventor
JOHN F. ROBB.

By Robert Robb
Attorneys

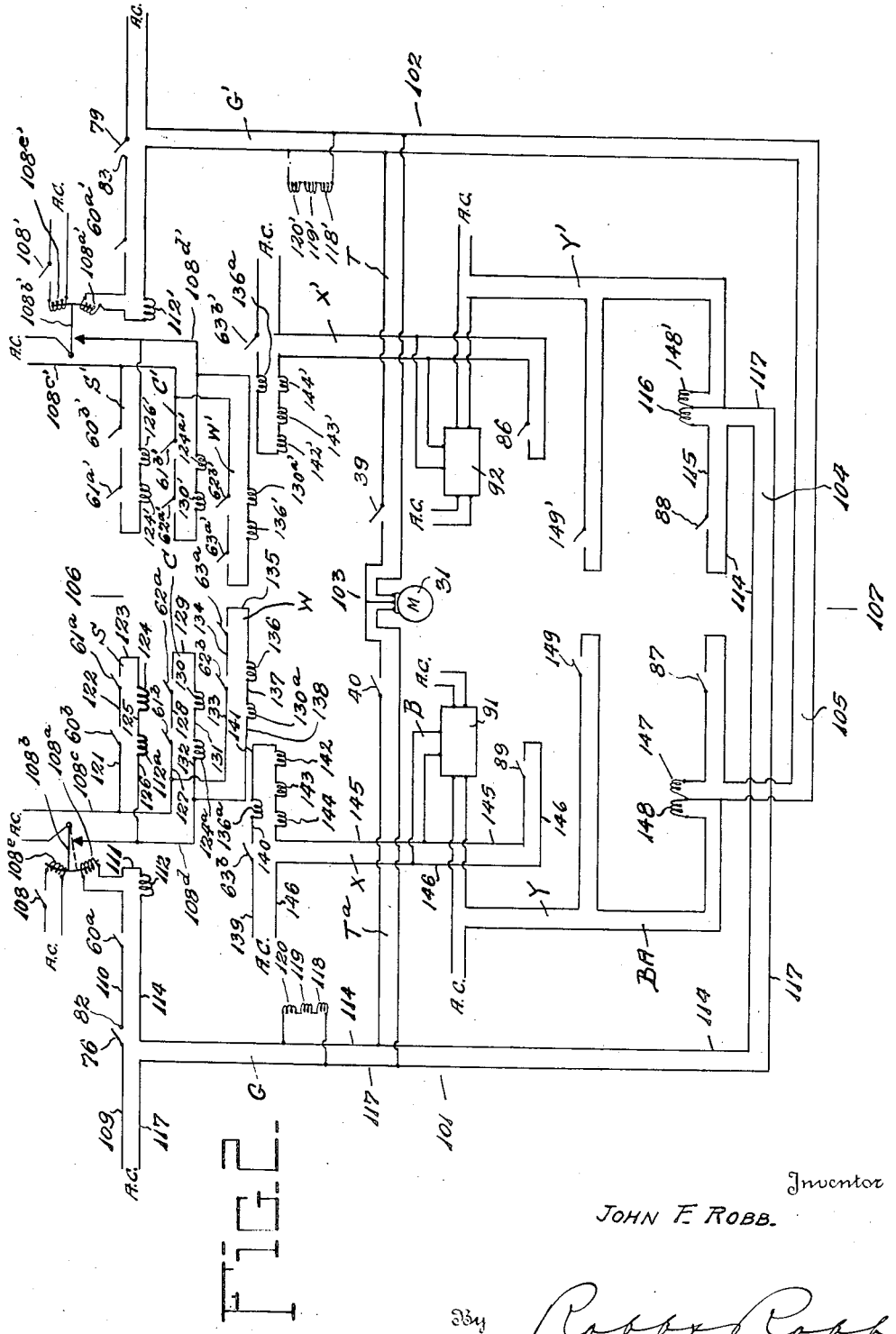

March 16, 1937.  J. F. ROBB  2,073,652
CENTRAL MIXING PLANT
Filed March 12, 1936  4 Sheets-Sheet 3
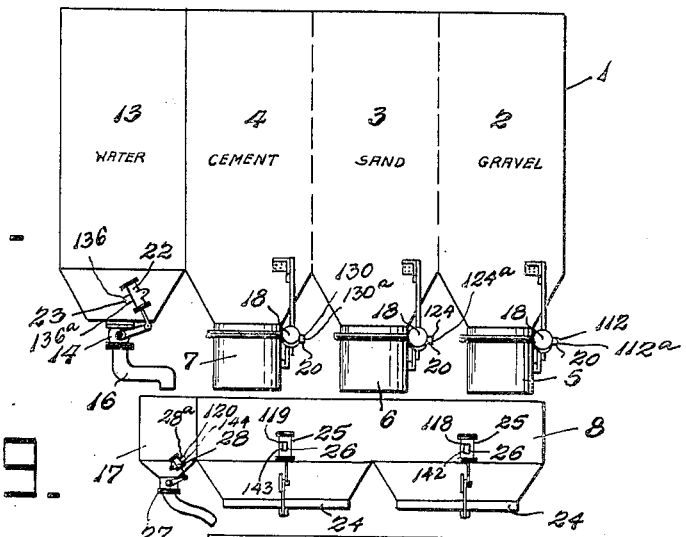
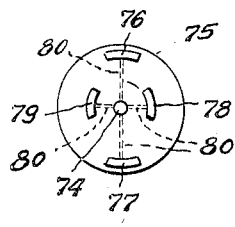
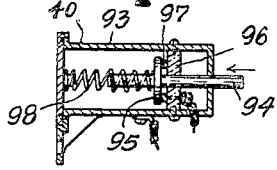
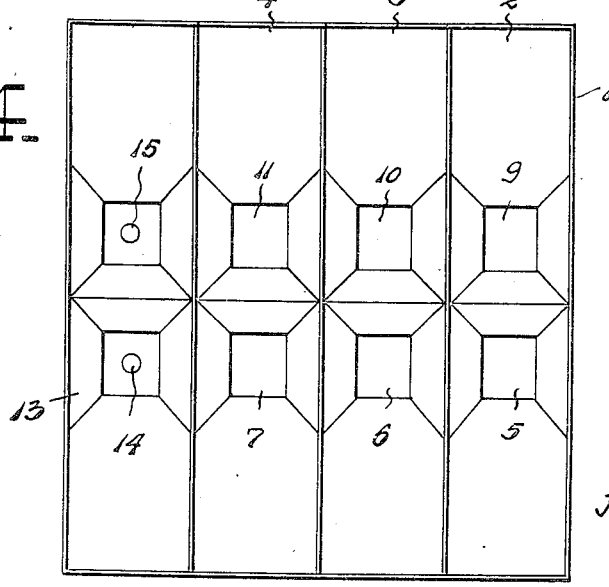
Inventor
JOHN F. ROBB.
By Robb & Robb
Attorney

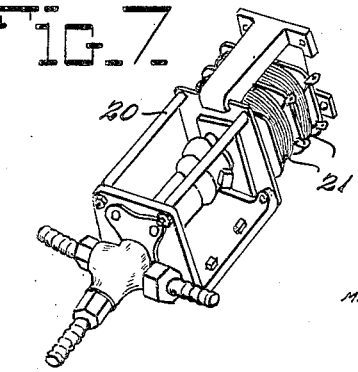
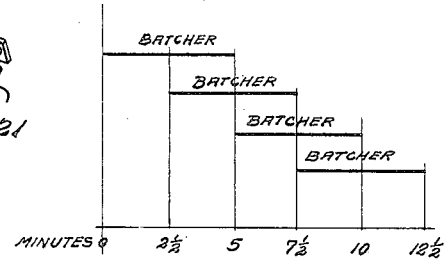
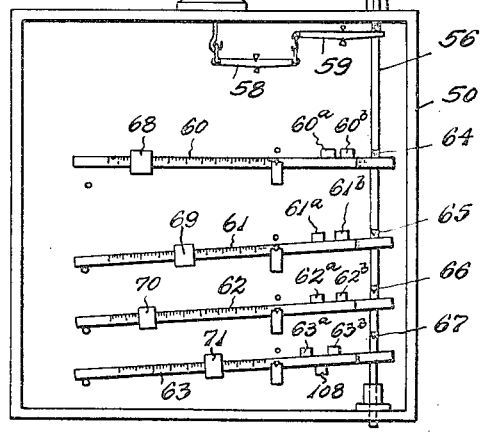

Patented Mar. 16, 1937

2,073,652

UNITED STATES PATENT OFFICE 2,073,652

CENTRAL MIXING PLANT

John F. Robb, Cleveland Heights, Ohio

Application March 12, 1936, Serial No. 68,561

20 Claims. (Cl. 83—73)

Aggregate weighing and proportioning plants for making the batches of materials for concrete or the like either avail of a multiple weighing hopper form of apparatus as exemplified by Robb Letters Patent No. 1,750,244, issued March 11, 1930, or of a multiple material single weighing hopper form of apparatus as disclosed in Bliss Letters Patent No. 1,826,919, among others.

The multiple weighing hopper form of apparatus employs a plurality of weighing hoppers, one separate hopper for each individual aggregate. In this construction the various aggregates which make a batch of concrete are supplied to the separate weighing hoppers simultaneously, and after the weighing operation of each aggregate is completed, the proportioned aggregates are simultaneously discharged from all the hoppers. Obviously, each weighing hopper of such proportioning plant must be provided with individual scale units and other controlling mechanism, and the construction of the same is therefore rather complicated and expensive.

The construction of the multiple materials single weighing hopper form of apparatus, as disclosed in the Bliss patent, is considerably simpler in that only one weighing hopper is employed for proportioning all of the aggregates that go into a batch of materials and only one scale unit for the weighing hopper is necessary. However, the output of proportioned aggregates of such proportioning plant is less in a given time than that of the multiple weighing hopper type, because the aggregates must be successively weighed, so that in many instances it is not satisfactorily efficient.

It is therefore the object of the present invention to provide a concrete proportioning plant wherein the output of the proportioned aggregates is much greater than in the single hopper form of apparatus and wherein the simplicity of construction of the latter is practically maintained.

A further object of the present invention is the provision of a plurality of multiple materials single weighing hoppers, the operation of which is overlapped for the purpose of considerably increasing the output of the apparatus as compared with the multiple materials single hopper plant.

In carrying out my invention, I avail of a plurality of multiple aggregates single weighing hoppers arranged below two sets of bin valves arranged below the bin opening of a single aggregate supply bin and timed in regard to each other in such a manner as to operate in overlapped cycles for their aggregate proportioning operations.

Each multiple materials single weighing hopper unit is provided with individual weighing and controlling instrumentalities. The weighing and controlling instrumentalities of each hopper, however, are timed in regard to each other by a common timing apparatus in such a way as to overlap the operation of the hoppers to thereby produce the largest output of proportioned aggregates which may be obtained in an apparatus of this character.

In this way it is possible, notwithstanding the consecutive weighing operations for the various aggregates, to obtain a highly efficient proportioning plant the construction of which is very simple and inexpensive as compared with apparatus of like efficiency.

Other and further objects of the present invention will become apparent from the following description and drawings, in which—

Figure 2 illustrates a wiring diagram for the various control and proportioning instrumentalities of the apparatus as shown in Figure 1.

Figure 3 is a partial side view of the apparatus as shown in Figure 1, certain parts of the construction being omitted for purposes of clarity.

Figure 4 is a plan view of the aggregate supplying bin structure as employed in connection with the proportioning plant as shown in Figure 1.

Figure 5 is a detail view of instrumentalities interconnecting the weighing scale unit with one weighing hopper.

Figure 6 is a front view of Figure 5.

Figure 7 is a perspective view of a solenoid operated three-way valve.

Figure 9 is a front view of the timing disc or wheel of the timing apparatus as shown in Figure 8.

Figure 10 is a diagram graphically illustrating the overlapped operation of the weighing hoppers.

Figure 11 is a detail view of one of the switches, which cooperates with a cam on the turn-chute for controlling the positioning of the latter.

Figure 1:
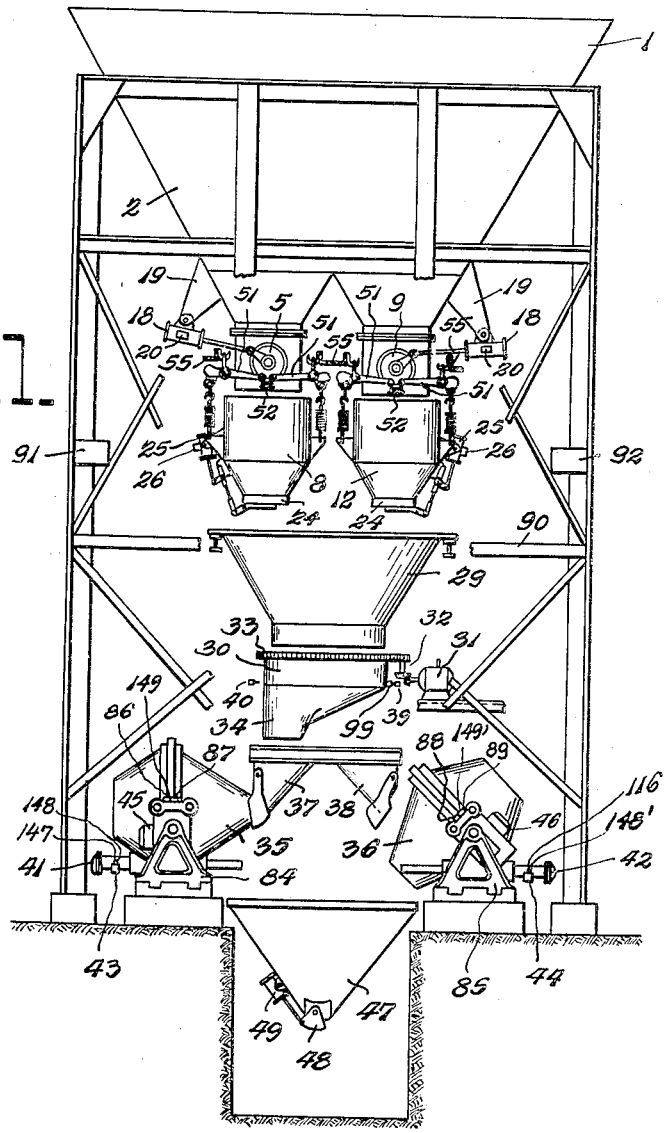
Figure 1 is a somewhat diagrammatic illustration of the aggregate proportioning plant of the present invention, certain parts being broken away.

Referring first to Figure 1, 1 indicates a storage or supply bin comprising a plurality of compartments 2, 3, and 4 adapted to contain the various aggregates to be weighed in this apparatus, such as gravel, sand, and cement, or the like. Each of the supply bin compartments is provided with valves or gates for discharging the aggregates therefrom.

The bin valves 5, 6, and 7 discharge into a single weighing hopper 8 arranged below said valves, as seen in Figure 1, while the valves 9, 10 and 11 effect the discharge of aggregates from the respective bin compartments into a single hopper 12 positioned below the same.

The weighing hoppers 8 and 12 are of sufficient length to permit the discharge of the aggregates from the bin valves into the same, as specified above.

A water storage tank 13 is provided and may preferably form a part of the bin structure 1, described above. The water storage tank 13 is provided with valves 14 and 15 having conduits 16 for discharging water into water weighing hopper compartments or tanks 17 associated with the weighing hoppers 8 and 12. Only one of these tanks is shown associated with the weighing hopper 8 in Figure 3, and it will be understood that hopper 12 is provided with a similar tank 17. In other words, the construction of the hoppers 8 and 12 is exactly the same.

The bin valves 5 to 7 and 9 to 11 are operated by means of air rams 18 pivotally supported on the bin structure 1 by means of brackets 19. The operation of these rams is controlled by three-way solenoid operated valves 20, a detail of which is shown in Figure 7. These rams are of usual commercial construction, as obvious to those skilled in the art. They are air operated and the three-way valves 20 controlled by solenoids 21 regulate the admission of compressed air to the ram to effect either the forward or return strokes of the pistons of the rams for opening or closing the bin valves.

In like manner, valves 14 and 15 are operated by rams 22 pivotally mounted on the water supply tank structure 13. The rams 22 are controlled by means of three-way solenoid valves 23 of exactly the same construction as solenoid valves 20. Only ram 22 and valve 14 are shown in Figure 3; the location of valve 15 is indicated in Figure 4. Both valves 14 and 15 and their operating mechanisms, however, are the same.

The weighing hoppers 8 and 12 are provided with gates 24 which are ram-operated, the rams 25 being controlled by solenoid valves 26 of a construction like the one shown in Figure 7, while the valves 27 of the water receptacle 17, carried by hoppers 8 and 12, are operated by solenoid valve controlled rams 28, the valve being of a structure exactly like that shown in Figure 7.

The weighing hoppers discharge the batches of weighed material into a chute 29 from where they slide into turnchute 30 which is rotatively arranged within the frame structure of the proportioning plant in any convenient manner and which is operated by means of a motor 31, a gearing system 32, and ring gear 33, to align the discharge portion 34 for discharge into a mixer 35 or 36 over chutes 37 and 38, respectively. Switches 39 and 40, mounted on the frame structure of the plant, and positioned as shown in Figure 1, are provided for stopping the motor 31 at the proper time, with the discharge end 34 in alignment with chute 37 or 38 in accordance with the cycle of the machine and as will be fully understood from a more detailed description, as later on set forth.

The mixers 35 and 36 are tilted for discharge or raised for charging position by means of air rams 41 and 42, the operation of which is controlled by the solenoid valves 43 and 44.

The mixers are rotated by electric motors 45 and 46 and discharge into a chute 47, the gate 48 of which is operated by an air ram 49 pivotally mounted thereon.

The weighing hoppers are provided with weighing devices which comprise a scale beam unit 50 and a plurality of beams 51, 52, 53, and 54. The weighing hoppers 8 and 12 are suspended from the beams 51 which in turn are movably mounted on the frame structure as indicated at 55.

The beams or levers 51 to 54 inclusive are of the usual construction, and interconnect the weighing hoppers with the scale beam unit by means of a rod 56 which is connected with an indicator scale 57 by levers or beams 58 and 59. Arranged within scale beam housing 50 is a plurality of scale beams 60, 61, 62, and 63. All of these weighing instrumentalities are of the usual commercial construction and need not be specifically described. However, it should be noted that the beams 60 to 63 inclusive are successively engaged by the rod 56, or its blades 64, 65, 66, and 67. In other words, first beam 60 is operatively connected with rod 56; when beam 60 balances, blade 65 engages beam 61; and when the latter balances, blade 66 engages beam 62, and so on until beam 63 is balanced. Of course, each hopper 8 and 12 has its separate complete weighing unit, as hereinbefore described.

Beam 60, which is used for weighing the first aggregate to go into a certain batch, for instance gravel, comprises the weight 68 and two mercury switches 60a and 60b. Beam 61 comprises a weight 69 and the mercury switches 61a and 61b. This beam is used for weighing the sand, while beam 62 is employed to determine the weight of cement to go into the batch of materials. The latter beam comprises the weight 70 and the mercury switches 62a and 62b. The beam 63, the final beam, carries the mercury switches 108, 63a and 63b and a weight 71. This beam determines the amount of water to go into a certain batch of materials.

Figure 8:
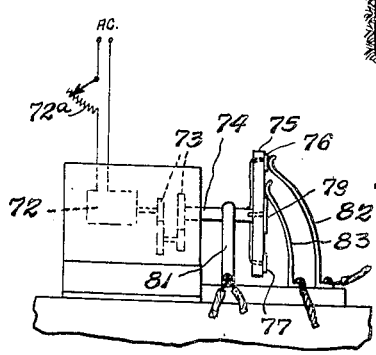
Figure 8 illustrates a timing device, such as employed in the present invention, for coordinating the operation of the weighing hoppers and their associated controlling instrumentalities.

Figure 8 illustrates a timing device for controlling the weighing operations; it comprises an electric variable speed motor 72, reduction gearing mechanism 73, shaft 74 carrying a rotatable disc 75 provided with contact plates 76, 77, 78 and 79. The disc 75 is made from insulation material and the contacts 76 to 79 inclusive are conductively connected with shaft 74 by means of wires 80. A contact blade 81 is provided and engages shaft 74. Contact blades 82 and 83 are adapted to engage the contact plates 76, 77 and 78, 79, respectively, while the disc 75 rotates to thereby either energize the electric circuit of the weighing hopper 8 or the circuit of the weighing hopper 12. The contact blades 81, 82, 83 are mounted upon a base of insulation material as clearly seen from Figure 8.

For the purpose of explanation it is assumed that to discharge the various aggregates to make a batch of materials from their respective bin compartments into one of the weighing hoppers 8 or 12 for weighing the aggregates therein and for discharging the same from one of said weighing hoppers into one of the mixers 35 or 36, a time of five minutes is necessary. However, in practice the time may be more or less. It will therefore be seen that every five minutes a batch of weighed materials is delivered from either hopper 8 or 12 into one of the mixers 35 or 36, as graphically indicated in Figure 10. By overlapping the operation of the weighing hoppers and their associated instrumentalities fifty percent, as illustrated in Figure 10, a discharge of a batch of proportioned aggregates may be delivered to the mixers 35 or 36 every 2½ minutes. Each mixer is timed in such a manner as to mix the materials received therein, to tilt to discharge position for discharging the materials into hopper 47 or the like, and to rise again to charging position in time to receive the next batch of materials.

Each mixer 35 and 36 is tiltably arranged within a frame structure 84 or 85, respectively. The mixer 35 is provided with mercury switches 86 and 87, while mixer 36 is provided with mercury switches 88 and 89.

The weighing scales 57 and weighing beam units 50 are preferably located in front of the weighing hoppers 8 and 12, this being the usual arrangement, as will be obvious to those skilled in the art.

Batchmeters for timing the mixing period of the mixers 35 and 36 are provided and these are preferably arranged near the weighing scale on the operator's platform 90. The batchmeter 91 controls the mixing period of mixer 35, while the mixing period of mixer 36 is controlled by batchmeter 92.

The switches 39 and 40 are of the construction shown in Figure 11, wherein 93 indicates the switch housing and 94 a movable member carrying the contact member 95. A part 96 of insulation material carries the contact ring 97. The spring 98 urges the contacts together and maintains the switch in closed position. However, when the abutment member 99 on turnchute 34 engages the movable member 94, the same is forced toward the spring 98, and the contacts 95 and 97 are separated, interrupting the current in the respective circuits in connection with which these switches are used.

Referring now especially to Figure 2, the electric circuits and the operation of the control instrumentalities will be described.

The apparatus of the present invention comprises a plurality of electrical circuits 101 and 102 which are only interconnected at points 103, 104 and 105. The circuits at the left of the vertical line 106—107 control the operation of weighing hopper 8 and associated instrumentalities, while the circuits at the right side of line 106—107 control the weighing operations of hopper 12 and its associated instrumentalities.

It is assumed that the weighing hopper 8 is empty and the contact plate 76 contacts with control blade 82 to start the cycle of weighing hopper 8. The weighing beams 60 to 63 inclusive of the unit 50 of hopper 8 are out of balance. The mercury switch 108 on the final weighing beam 63 is open and mercury switch 60a on the beam 60 is closed.

It may here be mentioned that the mercury switches 60a, 61a, 62a, 63a are closed when their respective beams with which they are associated are out of balance, and are opened when these beams are in balance or above their balancing positions. The mercury switches 60b, 61b, 62b, 108 and 63b are open when the beams 60, 61, 62 and 63 are out of balance and closed when these beams are in balance or above their balancing positions.

Electric current will now flow from a source of electrical energy over wire 109, contacts 76, 82, wire 110, mercury switch 60a, solenoid 108a, wire 111, solenoid 112 of the solenoid valve 20 of ram 18 of the gravel storage bin valve 5, wire 114, mercury switch 88 of mixer 36, wire 115, solenoid 116 of the solenoid valve 44 of ram 42, and back over wire 117. The solenoid 112 is energized and the gravel bin valve of gravel bin compartment 2 opens.

The energization of solenoid 108a, which is simultaneous with the energization of solenoid 112, closes a switch 108b associated therewith, which connects the circuits S, C, and W with a source of electrical energy over wires 108c and 108d. Switch 108b will therefore now be in a position as shown in dotted lines in Fig. 2 and will remain in such position until another solenoid 108e of switch 108b is energized, at which time the switch 108b is operated to open and to interrupt the flow of current to line 108c and 108d to render circuits S, C, W inoperative until switch 108b is closed again by energization of solenoid 108a.

Interconnected with wires 114 and 117 are solenoids 118, 119 and 120 of the ram valves 26 and 28a for effecting immediate closing of the gates 24 and valve 27 simultaneously with energization of solenoid 112 which opens bin valve 5 as above mentioned. Solenoid 116 is energized simultaneously with solenoid 112, and solenoid valve 44 will effect the operation of ram 42 to move the mixer 36 to righted position. By opening of valve 5 gravel is discharged into weighing hopper 8 until beam 60 balances. The weights 68, 69, 70 and 71 have of course been previously adjusted on the calibrated scale beams 60 to 63 inclusive for the respective weights desired for each aggregate to make up a certain batch of materials. When sufficient gravel is discharged into weighing hopper 8, beam 60 is balanced, and mercury switch 60a will open while mercury switch 60b is closed at the same time. It will be seen that solenoids 112, 116, 108a and 118 to 120 inclusive are thereby de-energized; however such de-energization does not effect the operation of the respective solenoid valves of the rams associated therewith; in other words the valves remain in their position.

However, the closing of mercury switch 60b, above referred to, which is connected to a source of electrical energy over wires 121, 122, mercury switch 61a, wire 123, solenoid 124 of the solenoid valve 20 of the ram 18 of the sand bin valve 6, wire 125, solenoid 112a of the solenoid valve 20 of the ram for gravel bin valve 5 and wire 126, causes energization of solenoids 112a and 124, and their associated air valves will effect the operation of the air rams of bin valves 5 and 6 to immediately close bin valve 5 and open bin valve 6 of the sand storage bin compartment 3. Sand is now discharged from the storage bin compartment 3 into weighing hopper 8 until beam 61 balances and mercury switch 61a opens. When beam 61 balances, mercury switch 61b closes immediately. Mercury switch 62a is closed because scale beam 62 is out of balance. Current will now flow from a source of electrical energy over wire 127, mercury switch 61b, wire 128, mercury switch 62a, wire 129, solenoid 130 of the solenoid valve 20 of ram 18 for the bin valve 7 of the cement bin compartment 4, wire 131, solenoid 124a of the solenoid valve of ram 18 of bin valve 6, and wire 132.

The solenoids 124a and 130 are now energized, and bin valve 6 closes while bin valve 7 opens.

Cement is now discharged into the weighing hopper 8, and when the desired amount of cement is obtained, beam 62 will balance and mercury switch 62a opens, de-energizing solenoids 124a and 130. The balancing of beam 62 will also cause the closing of mercury switch 62b and the current flows now from a source of current over wire 133, mercury switch 62b, wire 134, mercury switch 63a on beam 63, which is closed because 63 is out of balance, wire 135, solenoid 136 of the solenoid valve 23 of air ram 22 for the water valve 14, wire 137, solenoid 130a of the solenoid valve of ram 20 for bin valve 7, and wire 138.

Solenoids 130a and 136 are now energized and effect the closing of bin valve 7 and opening of water valve 14.

Water flows now from tank 13 into the tank 17 associated with the weighing hopper 8, and when the desired weight has been discharged into tank 17, beam 63, which is the final scale beam, balances. This will cause opening of mercury switch 63a, de-energizing solenoids 130a and 136.

The balancing of beam 63 causes also closing of mercury switch 63b which is in a circuit of the solenoids 142, 143, and 144 of the solenoid valves 26 and 28a, controlling the operation of the air rams 25 and 28 of the gates 24 and water valve 27 on the weighing hopper 8. The solenoid 136a of the solenoid valve 23 which controls the operation of the water valve 14 is also located in this circuit. Therefore, when mercury switch 63b is closed, this current flows in this latter circuit from a source of electric energy over wire 139, mercury switch 63b, wire 140, solenoid 136a, wire 141, solenoids 142, 143, 144, wire 145, mercury switch 89 which is closed because mixer 36 is now in righted position, and wire 146.

The solenoids 136a, 142, 143 and 144 are energized, valve 14 closes, and the gates 24 of weighing hopper 8 open, valve 27 of tank 17 associated with said hopper 8 opens also, and all of the weighed aggregates and water are discharged from hopper 8 and tank 17 into chute 29.

In view of the fact that mercury switch 108 is located on beam 63, it will close when this beam balances, and energize solenoid 108e to open switch 108b. Therefore, the flow of current to circuits S, C, and W is interrupted and is not reestablished again until switch 76 controlled by the timing mechanism is closed during the subsequent operation of the device. In other words, all the aggregates will be discharged from hopper 8 and tank 17 before the switch 108b is closed again. Therefore, a discharge of hopper 8 and tank 17 is accomplished before the weighing cycle for hopper 8 repeats.

Beam 63 will go out of balance before a full discharge is effected from hopper 8 and tank 17, and open switch 108; however, the deenergization of solenoid 108e does not effect a closing of switch 108b, the latter remaining open until solenoid 108a is energized again and a backward or reversed operation of circuits W, C, and S is prevented.

In view of the fact that a timer is used for initiating the operation of the weighing cycles for the weighing hopper 8, as well as for weighing hopper 12, however, no special delay mechanism is necessary. A more detailed description of the timer operation will therefore be set forth herein.

The disc 75 of insulation material, see Figure 9, carries contact plates 76 and 77 adapted to engage contact blade 82 for energizing solenoid 112. The rotation of the disc is preferably so timed that the same will perform one revolution in ten minutes. In other words, every five minutes one of the contact plates 76 or 77 will engage the contact blade 82 to energize the circuit of solenoid 112. This time of five minutes is usually sufficient to carry out all of the weighing and discharging operation for hopper 8. Therefore, it follows that the weighing hopper is at all times fully discharged before the new cycle of operation of the same starts.

In like manner the operation of hopper 12 is controlled by means of the contact plates 78 and 79, which cooperate with the contact blade 83.

The contact plates 76, 77, 78 and 79 remain in contact with the blades 82 or 83, respectively, a sufficient time within which the solenoids 112 or 112' must be maintained in operation; usually the mercury switches 60a or 60a' will open before the contacts 76, 77, or 78 and 79 interrupt their contact with the blades 82 or 83, respectively. Only when the maximum of gravel to be handled by this apparatus is used for making up a certain batch, the interruption of the contacts 76 or 77 with 82, and 78 or 79 with 83, will be about incident with the opening of the switches 60a and 60a'. Even in such case the mercury switches 60a or 60a' will open a little ahead of the timer contacts above referred to.

The gravel circuit G' of the weighing hopper 12 is energized 2½ minutes later than circuit G. The energization of the circuit G' to which the turnhead chute circuit T is connected causes operation of turnhead chute motor 31. The switch 39 of circuit T is closed in view of the fact that its part 94 is out of contact with cam 99, the turnhead chute being in opposite position, as shown in Figure 1, and the switch 40 of turnhead chute circuit Ta is opened by the cam or abutment 99.

The operation of motor 31 as referred to above causes rotation of turnhead chute 30 until its part 34 is in alignment with chute 37 and mixer 35, whereupon switch 39 is opened by cam 99 stopping the turnhead chute in this position. The mixer 35 is righted by energization of solenoid 147 at the same time as circuit G' is in operation. The solenoid 147 operates the air valve of ram 43 which in turn accomplishes the righting of mixer 35 as mentioned before, and when in upright position, mercury switch 87 opens, de-energizing solenoid 147. The materials discharged into chute 29 are therefore fed into mixer 35 over turnhead chute 30 and chute 37.

When the gates 24 and valve 27 open for discharging the materials in the continuously rotating drum of mixer 35, the batchmeter 91 is set for timing operation by means of electric circuit B; after the expiration of the mixing time the batchmeter will trip and circuit BA and solenoid 148 will be energized. Solenoid 148 operates the air valve of ram 43 to cause tilting of mixer 35 and the completely mixed aggregates are discharged into hopper 47 from where they are transferred to their place of use by means of belt conveyors, chutes, or the like, or concrete delivery trucks.

A mercury switch 149 adjacent mercury switch 86 on mixer 35 opens and interrupts the flow of current through circuit BA, when the mixer 35 is in discharge position.

The cycle of operation of hopper 8 and mixer 35 is now completed and repeats in the same order as soon as contact blade 82 contacts with the contact plate 77.

Gravel circuit G' and its associated circuits are of the same construction as gravel circuit G and its associated circuits, and therefore a detailed description of these circuits would only be a repetition and is therefore omitted. However, a general explanation is deemed advisable to explain the overlapped operation of the circuits for the weighing operations of hoppers 8 and 12 more fully.

As stated above, 2½ minutes after the energization of gravel circuit G, gravel circuit G' is set into function by the timing device. Gravel is discharged through bin valve 9 into weighing hopper 12. The turnhead chute is rotated as mentioned before, to align with mixer 35, and mixer 35 is righted. After the desired amount of gravel has been weighed and discharged into the weighing hopper 12, the remaining circuits, which are of exactly the same construction as those circuits described in connection with the weighing hopper 8, are set into function, and the weighing operation of all the aggregates to go into the weighing hopper 12 proceeds in a successive manner. Then the contents of the weighing hopper 12 and its associated water tank 17 are discharged into the mixer 36 over the turnhead chute 30, and, in view of the fact that in the meantime circuit G has again been energized, turnhead chute 30 is now in alignment with the mixer 36 which has also been righted by the operation of circuit G. The batchmeter 92 is set into operation and upon completion of the mixing period within the mixer 36, the mixed aggregates are discharged into the hopper 47.

The various circuits for controlling the weighing operation for the various aggregates may be generally indicated S, C, W, the S circuit controlling the weighing of the sand, the C circuit the weighing of the cement, and the W circuit the weighing of the water. These circuits are rendered operative successively after the energization of the gravel circuit G. In like manner the gravel circuit G' causes the successive automatic operation of the sand circuit S', the cement circuit C' and the water circuit W'.

To explain the overlapping operation of the electric circuits for the weighing hopper 8 and the weighing hopper 12 more fully, the cycle of operation of the entire unit is now briefly reviewed.

Upon energization of the gravel circuit G by the timing mechanism, the circuits S, C, and W are rendered operative one after the other, and finally the gate circuit X is energized for discharging the aggregates into the mixer. The circuit X energizes circuit Y over batchmeter 91 which effects the discharge of the mixed aggregates from the mixer 35 upon completion of the mixing period therein. The gravel circuit G', energized 2½ minutes after the gravel circuit G, renders the circuits S', C' and W' operative in a successive manner. This circuit also raises mixer 35 so that the same will be ready for receiving the aggregates from the weighing hopper 8 when the same discharges, which circuit G' also turns the turnhead chute into alignment with mixer 35, previously to the discharge of the aggregates from the weighing hopper 8. The water circuit W' energizes the gate circuit (for the weighing hopper 12) which is indicated X'. The materials are thereby discharged into the mixer 36 which has in the meantime been righted by the gravel circuit G which has been initiated previous to the discharge of the aggregates from the weighing hopper 12. The gravel circuit G also effected the turning of the turnhead chute in alignment with the mixer 36. Gate circuit X' renders the batchmeter 92 operative and when the batchmeter 92 trips, circuit Y' is energized and the discharge of the mixer 36 is effected. In this way the circuits for the weighing hoppers 8 and 12 perform their individual automatic operations while both sets of circuits for the weighing hoppers 8 and 12 are so interconnected as to effect the adjustment of the turnhead chute and the respective mixers at the proper time for receiving the weighed batch of materials, either from the weighing hopper 8 or from the weighing hopper 12.

It is therefore seen that the entire operation of the proportioning plant is automatic and the timing device is of such a construction that no adjustment of the same is necessary as the contact plates on the timing disc are arranged in such a manner that sufficient time is provided for carrying out the weighing operations of all possible weight combinations of aggregates. The timing mechanism also operates in such a manner that the gravel circuit G or the gravel circuit G' is not initiated before a full discharge of all the aggregates of the respective weighing hoppers is accomplished.

While I have illustrated only the utilization of two concrete mixers with the aggregate weighing and proportioning plant hereinbefore described, it must be understood that also four concrete mixers can be provided, and the circuits above described may be interconnected in such a manner with the operating mechanism for the two additional mixers that the weighed aggregates can be discharged from weighing hopper 8 and weighing hopper 12, into each of said four mixers in successive weighing operations of the weighing hoppers. This arrangement would be necessary in cases where the operation of the mixers is not fast enough to handle the aggregates discharged from the weighing hoppers.

As mentioned hereinbefore, the timer contacts for energizing the gravel circuits are set in such relation to each other that all operations of one circuit are carried out before it is again energized for the next cycle of operation. However, the time for discharging various aggregates from the storage bins, the weighing hoppers, etc., will vary in proportion to the moisture content of the aggregates, or other specific conditions of the same, and will further vary in proportion to the weights of such aggregates as desirable for different batches. To illustrate, in one case the proportion of the aggregates to make a certain batch may be 4:2:1; in another instance they may be 6:2:1. As will be seen from this example, the variation in weight between the aggregates is considerable, and an increase of time will be necessary to handle a batch of the latter mentioned proportions.

To adapt the plant of the present invention to any desired condition and to any amount and weight of aggregates, the speed of the motor 72 of the timer must be varied. Motor 72 is therefore a variable speed motor and its speed may be varied by manipulation of the rheostat 72a. In this way the revolutions of the timer disc 75 may be varied as desired and the time for each cycle of operation can be decreased or increased as necessary to make the plant adaptable for any condition of practice.

The control circuits of weighing hopper or batcher 12 have not been specifically described; the parts of the same which correspond to like parts of the circuits for batcher 8 have been correspondingly marked.

In the following a brief résumé of the entire cycle of operation of the apparatus is given—

The timer energizes circuit G; the respective weighing hopper gates close; and the gravel bin valve of the storage bins which contain the aggregates to be discharged into mixer 35 opens. Gravel is discharged into weighing hopper 8 and the proper amount is weighed therein. Simultaneously therewith turnhead chute aligns with the mixer 36 and mixer 36 is also righted. When the weighing of the gravel is completed the weighing operations for the sand, cement, and water are automatically carried out in a successive operation. When all the aggregates are now proportioned, the gates of weighing hopper 8 open and the contents are discharged over the turnhead chute, which is at this time in alignment with mixer 35, into said mixer. The batchmeter is set and the aggregates are mixed in the mixer a predetermined time, upon the expiration of which the batchmeter trips and mixer 35 is tilted. The aggregates are now discharged into hopper 47 and the cycle of the hopper 8 and mixer 35 repeats.

When the turnhead chute is in alignment with mixer 36 and mixer 36 is properly righted, the aggregates weighed in weighing hopper 12 are discharged into mixer 36. The batchmeter for this mixer 36 is set and now controls the mixing operation of the same. Upon completion of the mixing operation the batchmeter trips and the mixer 36 is tilted to effect the discharge of the aggregates therefrom. The timer now energizes circuit G', the gravel bin valve 9 opens, and gravel is discharged into the weighing hopper 12 and the desired amount is weighed therein. Simultaneously with the energization of the circuit G', weighing hopper gates 24 and 27 of weighing hopper 12 close and the turnhead chute is brought in alignment with mixer 35, which is now righted. After the weighing of the gravel is completed, the weighing of the sand, cement, and water is automatically performed in subsequent weighing operations, and when all these aggregates are properly proportioned, the weighing hopper gates 24 and 27 open and discharge the proportioned aggregates into mixer 36, which at this time is in a righted position, the turnhead chute being in alignment with mixer 36. Such alignment of the turnhead chute and mixer 36 is effected by the energization of the gravel circuit G at the proper time. The batchmeter for mixer 36 is now set into operation and the aggregates mixed for the proper time in mixer 36, upon the expiration of which the batchmeter trips and the aggregates are discharged from mixer 36 into hopper 47, whereupon the cycle for proportioning the aggregates for mixer 36 repeats.

From the foregoing it will be seen that the present invention includes also a novel arrangement of automatic control instrumentalities which carry out the operation of the proportioning plant in a proper sequential manner, and instrumentalities are provided for automatically overlapping the cycles of proportioning operations for the mixer 35 and mixer 36 in a proper manner so that a continuous uninterrupted operation of the plant is obtained.

Having thus described my invention, what I claim as new and desire to secure by Letters Patent of the United States, is—

1. In an aggregate proportioning plant of the class described, in combination, a plurality of multiple materials batchers, a source of supply of different materials for each of said batchers, control means for causing the materials to pass to each batcher from its source of supply, discharge means for said batchers, and instrumentalities for timing the passing of materials to and discharging the same from each batcher so that the cycles of operation of said batchers will be overlapped.

2. An aggregate proportioning plant as claimed in claim 1, wherein a common supply means is provided for the supply sources of materials for the said batchers.

3. An aggregate proportioning plant as claimed in claim 1, combined with mixing means associated with the batchers, and instrumentalities for conveying the contents of the batchers to the mixing means.

4. An aggregate proportioning plant as claimed in claim 1, combined with mixing means associated with the batchers, and instrumentalities for conveying the contents of the batchers to the mixing means, said mixing means comprising a mixer for each batcher, said timing mechanism including means controlling the charging and discharging actions of the mixers in timed relation to the discharge actions of the batchers.

5. In an aggregate proportioning plant of the class described, in combination, a plurality of multiple materials proportioning batchers, each adapted to handle the proportioning of a plurality of different materials charged thereinto and discharged therefrom, supply means for supplying different materials to each of said batchers, discharge means for each of said batchers, and timing means cooperating with the batchers and so controlling the charging and discharging operations of each batcher in relation to an associated batcher that the said operations are caused to take place in overlapping time periods.

6. In an aggregate proportioning plant of the class described, in combination, a plurality of multiple materials proportioning batchers, each adapted to handle the proportioning of a plurality of different materials charged thereinto and discharged therefrom, supply means for supplying different materials to each of said batchers, discharge means for each of said batchers, and timing means cooperating with the batchers and so controlling the charging and discharging operations of each batcher in relation to an associated batcher that the said operations are caused to take place consecutively.

7. In an aggregate proportioning plant of the class described, in combination, a plurality of multiple materials proportioning batchers, each adapted to handle the proportioning of a plurality of different materials charged thereinto and discharged therefrom, supply means for supplying different materials to each of said batchers, discharge means for each of said batchers, timing means cooperating with the batchers and so controlling the charging and discharging operations of each batcher in relation to an associated batcher that the said operations are caused to take place in overlapping time periods, and control means for the timing mechanism for increasing and decreasing the speed thereof to correspondingly vary the lengths of the time period in which each batcher is charged, performs its proportioning operation, and is discharged.

8. In an aggregate proportioning plant of the class described, in combination, a plurality of multiple materials proportioning batchers, each adapted to handle the proportioning of a plurality of different materials charged thereinto and discharged therefrom, supply means for supplying different materials to each of said batchers, discharge means for each of said batchers, timing means cooperating with the batchers and so controlling the charging and discharging operations of each batcher in relation to an associated batcher that the said operations are caused to take place in overlapping time periods, and means for varying the action of said timing mechanism to compensate for variation in the relative proportions of the different materials handled by the batchers.

9. In an aggregate proportioning plant of the class described, in combination, a plurality of multiple materials proportioning batchers, each adapted to handle the proportioning of a plurality of different materials charged thereinto and discharged therefrom, supply means for supplying different materials to each of said batchers, discharge means for each of said batchers, timing means cooperating with the batchers and so controlling the charging and discharging operations of each batcher in relation to an associated batcher that the said operations are caused to take place in overlapping time periods, and means for varying the action of said timing mechanism to compensate for variation in the weight of any one of the materials of the several which are proportioned by each batcher.

10. In an aggregate proportioning plant of the class described, in combination, a plurality of multiple materials proportioning batchers, each adapted to handle the proportioning of a plurality of different materials charged thereinto and discharged therefrom, supply means for supplying different materials to each of said batchers, discharge means for each of said batchers, timing means cooperating with the batchers and so controlling the charging and discharging operations of each batcher in relation to an associated batcher that the said operations are caused to take place in overlapping time periods, and means for varying the action of said timing mechanism to compensate for variation in the flow action of the materials which are handled by each batcher.

11. In an aggregate proportioning plant of the class described, in combination, a plurality of multiple materials batchers, source means to supply different materials to each batcher in consecutive order, weigh mechanism for each batcher to proportion the materials in a predetermined manner, charging means for each batcher intermediate the same and the source means, discharging means for each batcher, automatic instrumentalities to cause the charging of the different materials into each batcher by action of the charging means, and the discharging of properly proportioned batches of materials from each batcher when the proportioning operation is completed, and timing means controlling the said automatic operations of each batcher in such a manner that the time periods of such operations are overlapped.

12. In an aggregate proportioning plant of the class described, in combination, a plurality of proportioning batchers each adapted to handle and proportion a plurality of different materials, charging means for each batcher, discharging means for each batcher, a mixer associated with each batcher, timing mechanism controlling the operation of the batchers so that the time period of the operation of one batcher will overlap the time period of the operation of another batcher, and means to initiate the proportioning operation of one batcher with respect to that of said other batcher and at the same time conditioning the mixer of said other batcher to receive proportioned aggregates therefrom.

13. In an aggregate proportioning plant of the class described, in combination, a plurality of automatic batching units, each unit including charging means, discharging means, and weighing instrumentalities for weighing different materials in consecutive order in each unit, means for initiating the weighing operation of each unit, automatic means for carrying to completion the automatic operation of each unit to the point of discharging the same, and instrumentalities for causing the time periods of the automatic operations of said units to be overlapped.

14. In an aggregate proportioning plant of the class described, according to claim 13, combined with mixers, one for each automatic batching unit, a timer controlling the action of one of the batching units so as to condition the mixer cooperating with an associated batching unit for receiving the contents of the latter, and instrumentalities for causing mixing and discharging actions of the said mixers.

15. In an aggregate proportioning plant of the class described, according to claim 13, combined with mixers, one for each automatic batching unit, a timer controlling the action of one of the batching units so as to condition the mixer cooperating with an associated batching unit for receiving the contents of the latter, instrumentalities for causing mixing and discharging actions of the said mixers, and means between the batching units and the mixers for directing the contents of the batchers to the mixers, adapted to be conditioned by the timer for charging a mixer simultaneously without conditioning of the mixer to receive a batch of materials from an associated batching unit.

16. In an aggregate proportioning plant as claimed in claim 1, combined with mixing means associated with the batchers, instrumentalities for conveying the contents of the batchers to the mixing means, and means for varying the speed of the timing mechanism to thereby control the time consumed by each batcher in the performance of its complete cycle of receiving, proportioning and discharging of materials handled thereby.

17. An aggregate proportioning plant, comprising, in combination, aggregate supply means, a plurality of multiple materials single weighing batchers, discharge instrumentalities for the supply means, discharge instrumentalities for the batchers, a plurality of mixers associated with the batchers, a turnhead chute between said batchers and mixers, weighing instrumentalities associated with the batchers, control instrumentalities associated with said supply means, weighing instrumentalities, and batchers, for controlling the proportioning of aggregates in the batchers and for discharging the same into the mixers, the control instrumentalities including timing means and circuits for initiating aggregate proportioning operations of each batcher in overlapped cycles of operation with respect to each other, additional aggregate proportioning control circuits for automatically continuing the aggregate proportioning operations of each batcher initiated by the first mentioned circuits, means associated with the control circuits for continuing aggregate proportioning operations for discharging proportioned aggregates from the batchers into said mixers in successive order in relation to the overlapped cycle of operation of the batchers, and means for coordinating the position of the turnhead chute with said overlapped cycle of operation of the batchers and with said mixers for directing aggregates discharged from one batcher to its associated mixer.

18. An aggregate proportioning plant, comprising, in combination, a plurality of multiple materials single weighing batchers, aggregate supply means for the same, discharge means for said batchers, weighing instrumentalities for said batchers, timing means for controlling the supply means and discharge means of the batchers, a plurality of cooperating circuits associated with said timing means and weighing instrumentalities for causing the operation of the supply means, weighing instrumentalities and discharge means of the batchers in an overlapped cycle of operation for proportioning aggregates in said batchers and for successively discharging the same from the latter.

19. An aggregate proportioning plant, comprising, in combination, a plurality of aggregate storage compartments, a plurality of discharge means for each aggregate storage compartment, a plurality of multiple materials single weighing batchers for receiving aggregates from said discharge means, discharge instrumentalities for said batchers, a turnhead chute associated with said batchers, a plurality of mixers for receiving proportioned aggregates from said chute, control instrumentalities for each batcher for controlling the supply of aggregates from the storage compartment to each of said batchers and the proportioning of the aggregates therein, instrumentalities for conditioning the turnhead chute and one of the mixers for receiving a batch of proportioned aggregates from one of the batchers, and devices for conditioning the turnhead chute and the other of the mixers for receiving another batch of proportioned aggregates from another of said batchers, and means for operating the discharge means for said batchers to effect discharges of aggregates from the batchers into their associated mixers upon conditioning of the latter.

20. An aggregate proportioning plant, comprising, in combination, aggregate supply means, a plurality of multiple materials single weighing batchers, discharge instrumentalities for the supply means, discharge instrumentalities for the batchers, a plurality of mixers associated with the batchers, a turnhead chute between said batchers and mixers, weighing instrumentalities associated with the batchers, control instrumentalities associated with said supply means, weighing instrumentalities, and batchers, for controlling the discharge of aggregates from the supply means into the batchers, for proportioning the same therein and for discharging the aggregates into the mixers, and variable timing means for the control instrumentalities, the control instrumentalities including a plurality of inter-related circuits for each batcher overlapped in their cycle of operation with respect to each other.

JOHN F. ROBB.